H. G. MOUNTAIN.
ARTIFICIAL LIMB JOINT.
APPLICATION FILED APR. 26, 1920.
1,364,948.
Patented Jan. 11, 1921.
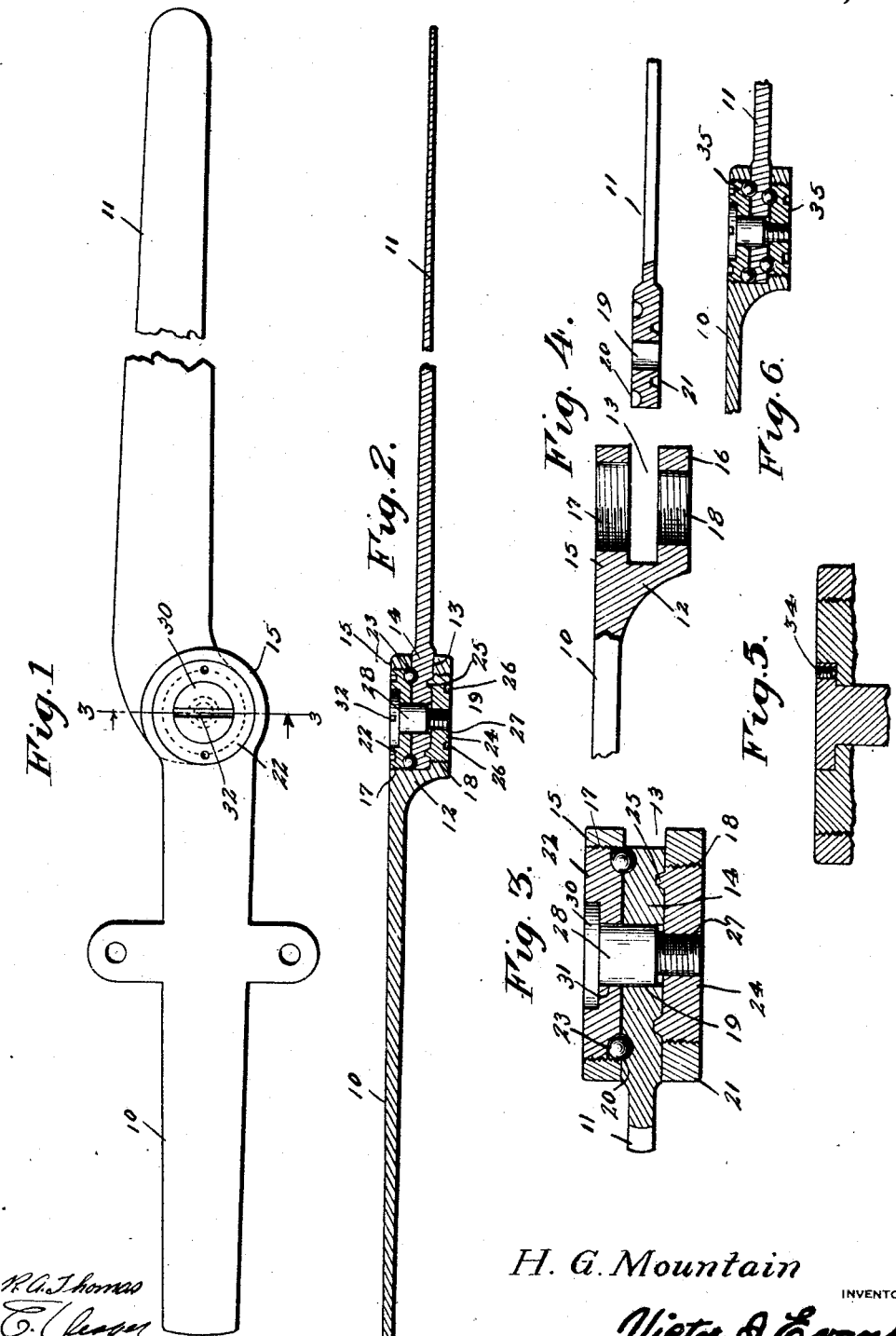
H. G. Mountain
INVENTOR
BY Victor J. Evans
ATTORNEY

UNITED STATES PATENT OFFICE.

HERBERT G. MOUNTAIN, OF WASHINGTON, DISTRICT OF COLUMBIA.

ARTIFICIAL-LIMB JOINT.

1,364,948.

Specification of Letters Patent.

Patented Jan. 11, 1921.

Application filed April 26, 1920. Serial No. 376,711.

*To all whom it may concern:*

Be it known that I, HERBERT G. MOUNTAIN, a citizen of the United States, residing at Washington, D. C., have invented new and useful Improvements in Artificial-Limb Joints, of which the following is a specification.

This invention relates to joints for artificial limbs, and has for one of its chief characteristics the provision of a joint which is extremely simple in construction, one which can be readily assembled or dis-assembled as the occasion may require, and designed to possess maximum strength and durability.

Another and very important object of the invention, resides in the provision of a joint of the above mentioned character which can be readily and easily adjusted from time to time by the user of the leg to eliminate lost motion laterally, and also the noise usually resultant therefrom.

The nature and advantages of the invention will be better understood when the following detail description is read in connection with the accompanying drawing, the invention residing in the construction, combination and arrangement of parts as claimed.

In the drawing forming part of this application, like numerals of reference indicate similar parts in the several views and wherein:—

Figure 1 is a side elevation of the joint constructed in accordance with my invention.

Fig. 2 is a longitudinal sectional view.

Fig. 3 is a transverse sectional view through the joint.

Fig. 4 is a fragmentary view showing the ends of the respective members separated.

Fig. 5 is a view somewhat similar to Fig. 2 of a modified form of the invention.

Fig. 6 is a sectional view of a modified form of the invention.

Referring to the drawing in detail, 10 and 11 indicate respectively the members of the joint which are adapted to be suitably secured to the sections of the leg above and below the knee. These members may be constructed from any suitable material and also vary in size and cross sectional configuration without departing from the spirit of the invention. As shown in Fig. 4, one end of the member 10 is thickened as at 12, and provided with a slot 13 of proper size to properly accommodate a slightly offset terminal or end portion 14 of the member 11. The separated portions 15 and 16 respectively defined by the slot 13 of the member 10 are provided with alined openings 17 and 18 which communicate with the slot 13. The terminal 14 of the member 11 is also provided with a central opening 19 which registers with the openings 17 and 18 when the members 10 and 11 are associated. The opposed sides of the extremity 14 of the members 11 are provided with annular grooves 20 and 21, respectively which are concentrically disposed about the opening 19, the groove 20 being of slightly smaller diameter than the groove 21. The opening 17 is slightly larger than the opening 18, and is adapted to receive the ball race 22 which is threaded in the opening 17 as shown. The balls 23 are partly fitted in the annular groove 20 of the member 11 when the parts are associated, best illustrated in Fig. 2. Threaded within the opening 18 is a nut 24 having an annular flange 25 which is received within the annular groove 21 of the member 11, thus properly supporting the latter between the nut and the ball race 22. The nut 24 is provided with a spaced depression 26 to accommodate a suitable tool for assembling or dis-assembling the parts as the occasion may require. The nut is further provided with a central opening 27 which is threaded to the stem 28 of a bolt utilized to hold the parts operatively associated. This bolt is provided with a head 30 which is fitted in a recess 31 on the ball race 22, so as to lie substantially flush with the latter. The head 30 of the bolt is provided with a groove 32 to accommodate a screw driver or other suitable tool which may be used to adjust the bolts. The component parts of the joint are assembled in the manner clearly shown in Figs. 2 and 3 and held associated by means of the bolts 28, with the movable member 11 properly fitted and supported between the ball race 22 and the nut 24. When it is found necessary to compensate for any looseness at a lost motion or the like, incident to wear and prolong the use of the joint, the bolt 28 is loosened and either or both of the ball race 22 and nut 24 is properly adjusted, subsequent to which adjustment the bolt 28 is tightened. Manifestly the construction and arrangement of parts is such that this adjustment can be readily and easily made by the user of the leg to eliminate lost motion laterally of the joint or any noise that might result therefrom. It might further be stated that the component parts of the joint proper are constructed from higher grade material than the members 10 and 11, this fact coupled with the particular arrangement of the parts providing maximum strength and durability of the joint proper, thereby minimizing the possibility of the members 10 and 11 breaking at the opposite sides of the joint which frequently occurs.

In Fig. 5 I have illustrated a modified form of the invention, wherein use is made of a threaded locking element 34, associated with the head of the bolt 28 to prevent retrograde movement of the latter. Otherwise, the construction is the same as hereinabove described.

In Fig. 6 I have shown a further modified form of the invention, which is distinguished from the preferred form by making use of a ball race 35 on each side of the member 11, in contra-distinction to the construction shown in Fig. 3, wherein one ball race 22 and a nut 24 are used in combination as antifriction members and which bear against the opposed sides of said member 11. Otherwise the construction is the same as that shown and described in Fig. 3.

While it is believed that from the foregoing description, the nature and advantages of the invention will be readily apparent, I desire to have it understood that I do not limit myself to the details herein shown and described and that such changes may be resorted to when desired as fall within the scope of what is claimed.

Having thus described my invention what I claim as new is:

1. A joint for artificial limbs comprising complementary members having their adjacent ends interfitted, one of said members being pivoted with respect to the other, means for limiting the pivotal movement of said member, nuts threaded into the other of said members and arranged at the opposite sides of the aforementioned member, anti-frictional means interposed between the confronting faces of said nuts and the adjacent side of the member therebetween, and a bolt passed through all of said parts and threaded into one of said nuts, the threads of said bolt being finer than the threads of the nuts to lock said parts in adjusted position.

2. A joint for artificial limbs comprising complementary members having their adjacent ends interfitted, one of said members being pivoted with respect to the other, means for limiting the pivotal movement of said member, nuts threaded into the other of said members and arranged at the opposite sides of the aforementioned member, anti-frictional means interposed between the confronting faces of said nuts and the adjacent sides of the member between the same, said means including an annular flange projecting from one of said nuts, and a bolt passed through all of said parts and threaded into the latter mentioned nut as and for the purpose specified.

3. A joint for artificial limbs comprising complementary members having their adjacent ends interfitted, and pivotally connected together, nuts threaded into the opposed sides of one of said members and arranged at the opposite sides of the other member, the latter mentioned member having annular grooves in both sides thereof, anti-frictional means interposed between the confronting faces of said nuts and the adjacent sides of the second mentioned member and fitted within said grooves, one of said nuts having a recess, and a headed bolt passed through all of said parts and threaded into the other of said nuts, the head of the bolt seated in said recess.

4. A joint for artificial limbs comprising complementary members having their adjacent ends interfitted, the end of one of said members having grooves in the opposed sides thereof, said grooves being of different diameters, nuts threaded into the adjacent end of the other of said members and arranged at the opposite sides of the first mentioned member, anti-friction means interposed between the confronting faces of said nuts and the adjacent sides of the first mentioned member, said means including an annular flange fitted in one of said grooves and carried by one of said nuts, and a bolt passed through all of said parts and having threaded engagement with the said nuts.

5. A joint for artificial limbs comprising complementary members, spaced apertured lugs projecting from one end of one of said members and adapted to receive therebetween the adjacent end of the other member, the apertures of said lug being of relatively different diameters and threaded, the latter mentioned member having annular grooves in the opposed sides thereof, nuts threaded in the said apertures of the lugs and arranged at the opposite sides of the second mentioned member, anti-frictional means disposed between the confronting faces of said nuts and the adjacent sides of the second mentioned member, said means projecting within said grooves, one of said nuts having a recess therein, a headed bolt passed through all of said parts and threaded into one of said nuts, and the head of said bolt being seated in said recess.

6. A joint for artificial limbs comprising complementary members having their adjacent ends interfitted, one of said members being pivoted with respect to the other, nuts threaded into the other of said members and arranged at the opposite sides of the aforementioned member and a concentric annular bearing including a coöperating circumferential groove and rib interposed between the confronting faces of one of said nuts and the adjacent side of the member between the same, and a bolt passed through all of said parts and threaded into one of said nuts with threads that form a lock for said parts.

In testimony whereof I affix my signature.

HERBERT G. MOUNTAIN.